United States Patent Office 2,820,671
Patented Jan. 21, 1958

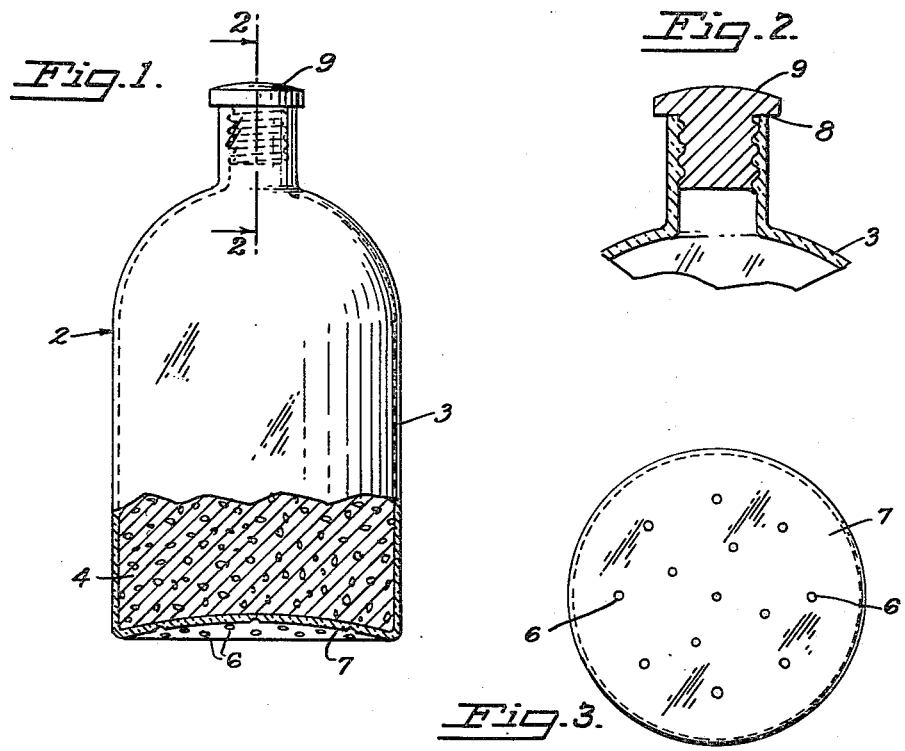
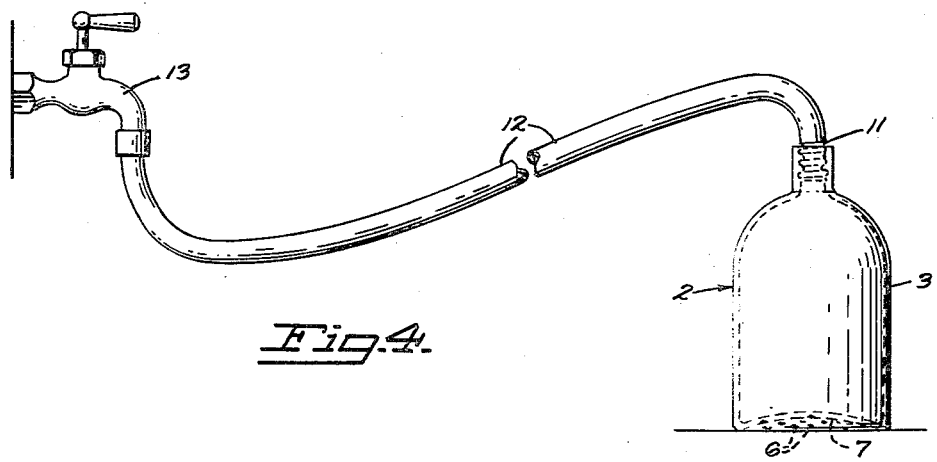

2,820,671

METHOD OF DISTRIBUTING SOIL TREATING MATERIAL

Gerald B. McFarland, McFarland, Calif., assignor to M. B. McFarland & Sons, McFarland, Calif., a partnership Application October 3, 1955, Serial No. 538,108

2 Claims. (Cl. 299—83)

This invention relates to the packaging and dispensing of soil treating material, and more particularly to a perforatable dispensing package for distributing fertilizer or the like.

Soil treating materials, such as fertilizers and soil conditioners, are commonly sold in paper, cardboard or metal containers that function merely as a means of transporting and storing the packaged material. The contents of the usual package are distributed by opening the package and spreading the material by hand or by means of a spreading device. When the fertilizer is spread by hand, and then further distributed by a spray or stream of water, the process is usually messy, and the stream of water generally damages young plants. If one of the numerous well known fertilizer distributing devices is utilized, it is necessary to transfer the soil treating material to the spreading device before the material can be applied to the ground. Also, for small scale application of soil treating material, as practiced by the usual home owner, the added expense of purchasing a mechanical spreading device is unwarranted.

Summarizing this invention, a dispensing package is provided which comprises a water distributable soil treating material, such as fertilizer or soil conditioner, a perforatable water resistant container completely enclosing the soil treating material, and hose coupling means on the container for connecting the container to a hose. In use the package is connected to a hose by means of the coupling, the container is perforated, and the flow of water is turned on to uniformly distribute the soil treating material by means of water flowing into the container and out through the perforations. It is immaterial whether the container is coupled to the hose before or after it is perforated.

By this arrangement, the package is utilized for transporting, storing and distributing the fertilizer without the necessity of employing additional dispensing or soaking devices. The dispensing package of this invention is particularly useful for distributing the small amounts of soil treating material that are employed in the usual home garden.

With reference to the drawings:

Fig. 1 is a side elevation of a preferred form of dispensing package with parts broken away for purposes of clarity to illustrate the soil treating material contained in the package.

Fig. 2 is a fragmentary vertical section of the hose coupling means and closure therefor taken through the line 2—2 in Fig. 1.

Fig. 3 is a view taken from the bottom of the package showing indicia for marking perforatable areas on the container.

Fig. 4 is a schematic side elevational view of the package attached to a hose for distribution of the contents by a stream of water.

In greater detail, the dispensing package 2 includes water resistant container 3 which encloses soil treating material 4. Indicia 6 on the bottom 7 of container 3 mark closed perforatable locations that are punctured when the soil treating material is to be distributed. When the container 3 is relatively thick, the areas marked by indicia 6 are preferably pre-weakened so that they may be readily punctured.

Internally threaded mouth 8 of the container 3 is sealed by threaded closure plug 9 during transportation and storage of the package. Mouth 8, which is formed in an outwardly projecting neck part of the container, serves as an opening for introduction of the soil treating material 4 into container 3, and also provides a coupling between container 3 and the usual threaded connection 11 of hose 12 when closure plug 9 is removed. Hose 12 is in turn connected to conventional faucet 13 for turning the flow of water on and off in order to distribute soil treating material 4 by means of the flowing water.

In operation, closure plug 9 is unscrewed from the mouth 8 of the container 3 and the container is coupled to hose 12 by screwing the threaded connection 11 of the hose into internally threaded mouth 8. The container 3 is punctured either before or after it is coupled to the hose at the locations marked by indicia 6 with any sharp object, such as a nail or awl. When the flow of water is turned on at faucet 13, the water flows through hose 12 into container 3, through the soil treating material 4, and finally out through the perforated locations marked by indicia 6. The stream of water is divided as it passes through the perforations, and soil treating material 4 is carried by the divided flow of water. When the dispensing package 2 is employed in this manner, it serves as a sprinkler for distributing soil treating material with the water.

If desired, the container 3 may be utilized as a soaker or irrigator for causing soil treating materials previously distributed on the ground to be soaked into the soil. When the package 2 is used in this manner, the soil treating material is first distributed on the ground either by hand, by a spreading device, or by water flowing through the material in the container 3, as previously described. The container 3, which has first been perforated and coupled to hose 12, is placed on the ground and the flow of water is turned on. The full force of the stream of water is dissipated against the interior of container 3, and water streaming into the package flows gently out of the perforations onto the soil without damaging small plants. After one area has been irrigated, the package is moved to another area and the soaking is continued. When the container 3 is employed in this manner, it is preferably perforated on a side rather than on the end directly opposite the point at which the water flows into the container in order to block the rapid flow of water.

The package of this invention is particularly adapted for dispensing water distributable soil treating material, such as fertilizer or soil conditioners. Such material is either readily soluble in water or it is in the form of small particles that are carried along with the flow of water and distributed uniformly on the ground. The usual granular or irregular shape of fertilizers and soil conditioners permits the water to flow through the spaces in the packaged soil treating material and out of the perforations in the package. In addition to fertilizers and soil conditioners, other soil treating materials, such as insecticides may also be packaged for distribution in accordance with this invention.

The container 3 may be composed of any water insoluble material that is perforatable, and that does not disintegrate in the presence of water. Flexible, synthetic resinous sheet material, such as polyethylene, is preferred for the container 3 since it is readily perforated and is water resistant. The thickness of container 3 is not critical as long as the container is perforatable, and is strong enough to withstand the water pressure encountered. Relatively thin bags of flexible plastic material are very suitable for this purpose. Untreated paper and paperboard products are, of course, unsatisfactory unless impregnated with a strengthening and water resistant material.

The hose coupling means on the container 3 is used both as an opening for introducing soil treating material into the container, and as the means of connecting the container to a source of flowing water. The coupling means is not necessarily in the form of a threaded mouth 8 as illustrated in the drawing. For example, good results are also obtained with containers of flexible material that are closed by a twisted wire or cord during transportation and storage of the material. The same wire or cord is employed for coupling the container 3 to the hose 12. This is readily accomplished by placing the mouth of the container around the outside of the hoze nozzle, and twisting the wire around the package mouth to couple the package securely to the hose.

The user of the package of this invention can readily puncture the container at indicia 6 which are preferably marked at locations that give optimum distribution of the soil treating material 4. The container is then readily coupled to a garden hose, and the contents distributed without messiness or the use of additional spreading devices.

I claim:

1. The method of distributing soil treating material which comprises providing a package of soil treating material completely enclosed in a perforatable water impermeable imperforate container which has closed hose coupling means, opening said hose coupling means, coupling said container by said hose coupling means to a hose connected to a source of water, perforating said container, and effecting a flow of water through said hose to distribute said soil treating material contained in said container.

2. The method of distributing soil treating material which comprises providing a package of soil treating material completely enclosed in a perforatable water impermeable imperforate container which has an outwardly projecting internally threaded closed neck portion providing closed hose coupling means, opening said hose coupling means, coupling said soil container by said hose coupling means to a hose connected to a source of water, perforating said container, and effecting flow of water through said hose to distribute said soil treating material contained in said container.

References Cited in the file of this patent

UNITED STATES PATENTS

| | | |
|---|---|---|
| 718,357 | Kade | Jan. 13, 1903 |
| 1,233,431 | Witt | July 17, 1917 |
| 1,749,215 | Glitzlse | Mar. 4, 1934 |
| 2,117,091 | Gudmundsen | May 10, 1938 |
| 2,179,932 | Hartman | Nov. 14, 1939 |
| 2,461,067 | Lewis | Feb. 8, 1949 |
| 2,463,862 | Gibadlo | Mar. 8, 1949 |
| 2,554,393 | Webb | May 22, 1951 |
| 2,723,905 | Coakley | Nov. 15, 1955 |